US012613853B2

(12) United States Patent
Desai et al.

(10) Patent No.: US 12,613,853 B2
(45) Date of Patent: Apr. 28, 2026

(54) FAST ITERATORS FOR KEY-VALUE DATABASES

(71) Applicant: Oracle International Corporation, Redwood Shores, CA (US)

(72) Inventors: Rajesh Desai, Sunnyvale, CA (US); Ben George, San Jose, CA (US); Pinky Kushwaha, Lucknow (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/821,560

(22) Filed: Aug. 30, 2024

(65) Prior Publication Data

US 2026/0064652 A1     Mar. 5, 2026

(51) Int. Cl.
*G06F 16/22* (2019.01)
*G06F 16/27* (2019.01)
*G06F 16/28* (2019.01)

(52) U.S. Cl.
CPC .......... *G06F 16/2282* (2019.01); *G06F 16/27* (2019.01); *G06F 16/282* (2019.01)

(58) Field of Classification Search
CPC .............................. G06F 16/2282; G06F 16/27
USPC ........................................................ 707/803
See application file for complete search history.

(56) References Cited

U.S. PATENT DOCUMENTS

| | | | |
|---|---|---|---|
| 8,898,111 B2 | 11/2014 | Lyle et al. | |
| 10,515,064 B2 | 12/2019 | Bennett et al. | |
| 11,726,684 B1 * | 8/2023 | Sangle | G06F 3/0604 |
| | | | 711/171 |
| 2015/0370860 A1 * | 12/2015 | Bender | G06F 16/258 |
| | | | 707/693 |
| 2017/0132260 A1 * | 5/2017 | Bi | G06F 16/2455 |
| 2017/0193041 A1 * | 7/2017 | Fuchs | G06F 16/21 |

FOREIGN PATENT DOCUMENTS

| | | |
|---|---|---|
| CN | 111444413 A | 7/2020 |
| CN | 114911806 A | 8/2022 |
| CN | 115391611 A | 11/2022 |

(Continued)

OTHER PUBLICATIONS

Improving Data Access with Secondary Indexes, Available online at: https://docs.aws.amazon.com/amazondynamodb/latest/developerguide/SecondaryIndexes.html, Accessed from Internet on Apr. 26, 2024, pp. 1-8.

(Continued)

*Primary Examiner* — Muluemebet Gurmu
(74) *Attorney, Agent, or Firm* — Kilpatrick Townsend & Stockton LLP

(57) ABSTRACT

Various techniques are provided for enabling an iterator (called persistent key-value (KV) iterator) that uses a special key structure embedded with secondary index information for efficient search (or query) of a key-value database (KVDB). In some embodiments, the key structure comprises a plurality of fields categorized into two groups, infrastructure hierarchy fields and object characteristic fields. Keys for the KVDB may be partitioned into one or more levels of hierarchy to generate many smaller key lists for easy search/query of the KVDB. These smaller key lists can be used for concurrent searches/queries.

20 Claims, 11 Drawing Sheets

(56)             References Cited

FOREIGN PATENT DOCUMENTS

| CN | 115543993 A | 12/2022 |
| JP | 3947202 B2 | 4/2007 |

OTHER PUBLICATIONS

Merge Indexes, Available online at: https://docs.groupdocs.com/search/net/merge-indexes/, Accessed from Internet on Apr. 26, 2024, pp. 1-2.

Multi-core Adaptive Merging of the Secondary Index for LSM-Based Stores, Available online at: https://link.springer.com/chapter/10.1007/978-3-031-39821-6_20, Aug. 16, 2023, pp. 1-8.

Qader et al., Efficient Secondary Attribute Lookup in Key-Value Stores, Available online at: http://dblab.cs.ucr.edu/projects/KeyValueIndexes/IEEE-big-data-15.pdf, 2015, pp. 1-12.

* cited by examiner

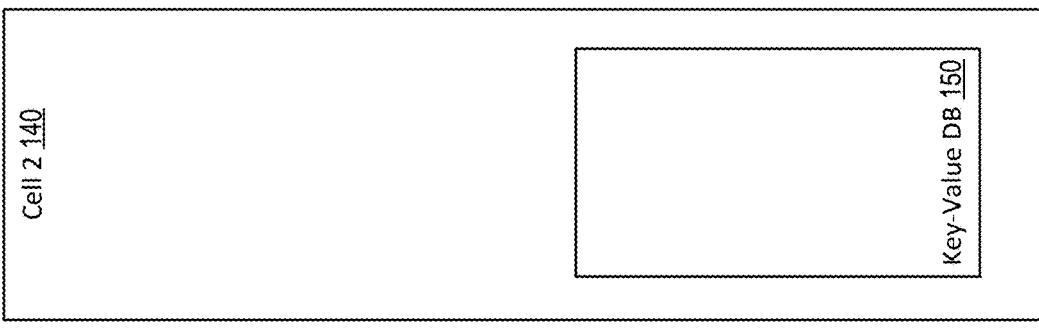
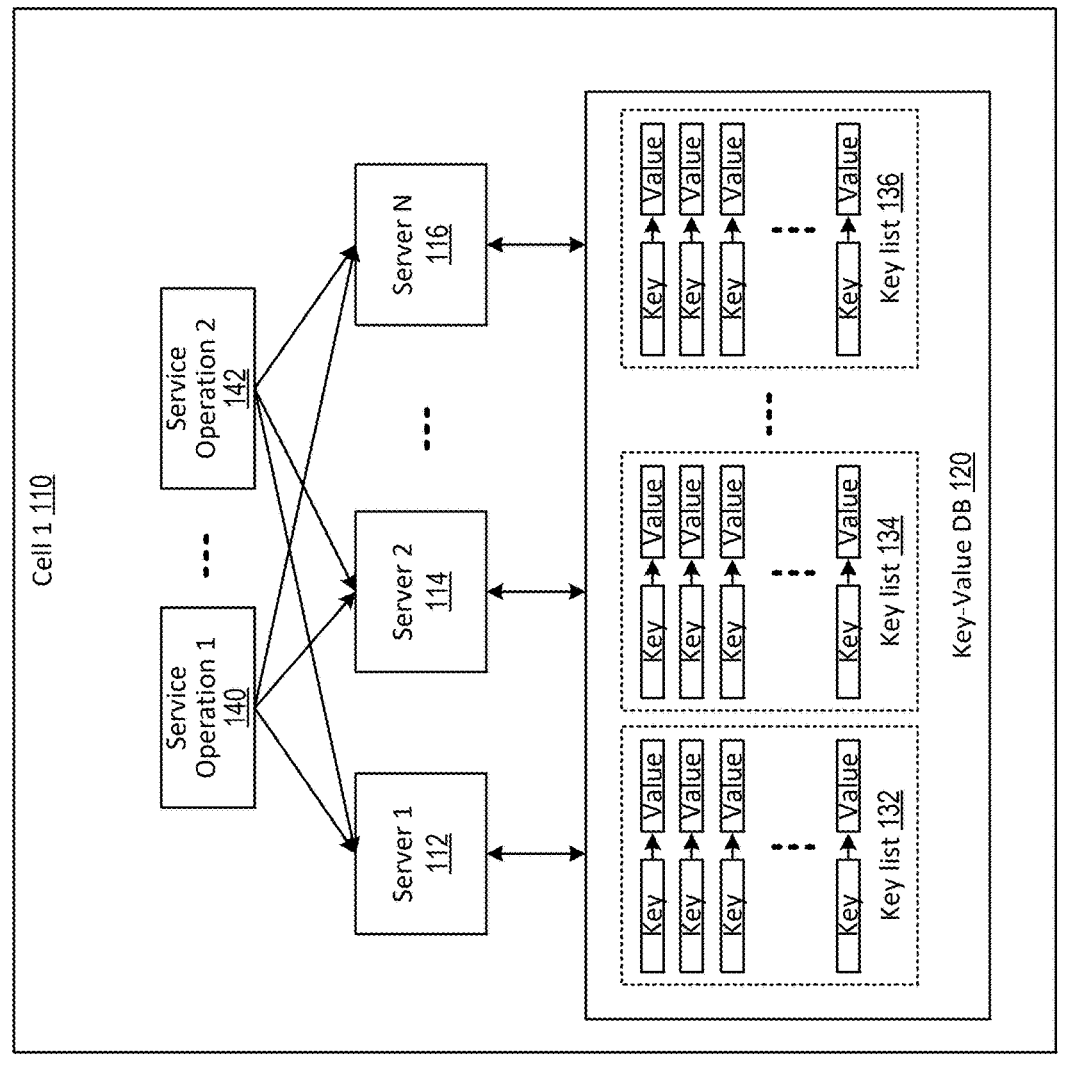
FIG. 1

300

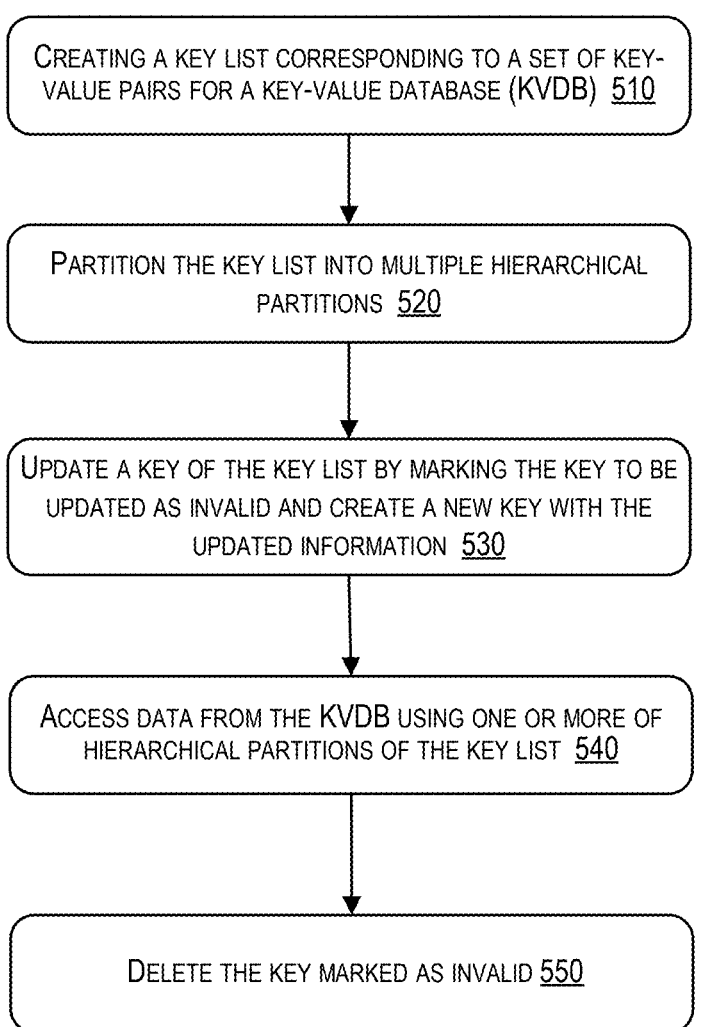

CREATING A KEY LIST CORRESPONDING TO A SET OF KEY-VALUE PAIRS FOR A KEY-VALUE DATABASE (KVDB) 510

PARTITION THE KEY LIST INTO MULTIPLE HIERARCHICAL PARTITIONS 520

UPDATE A KEY OF THE KEY LIST BY MARKING THE KEY TO BE UPDATED AS INVALID AND CREATE A NEW KEY WITH THE UPDATED INFORMATION 530

ACCESS DATA FROM THE KVDB USING ONE OR MORE OF HIERARCHICAL PARTITIONS OF THE KEY LIST 540

DELETE THE KEY MARKED AS INVALID 550

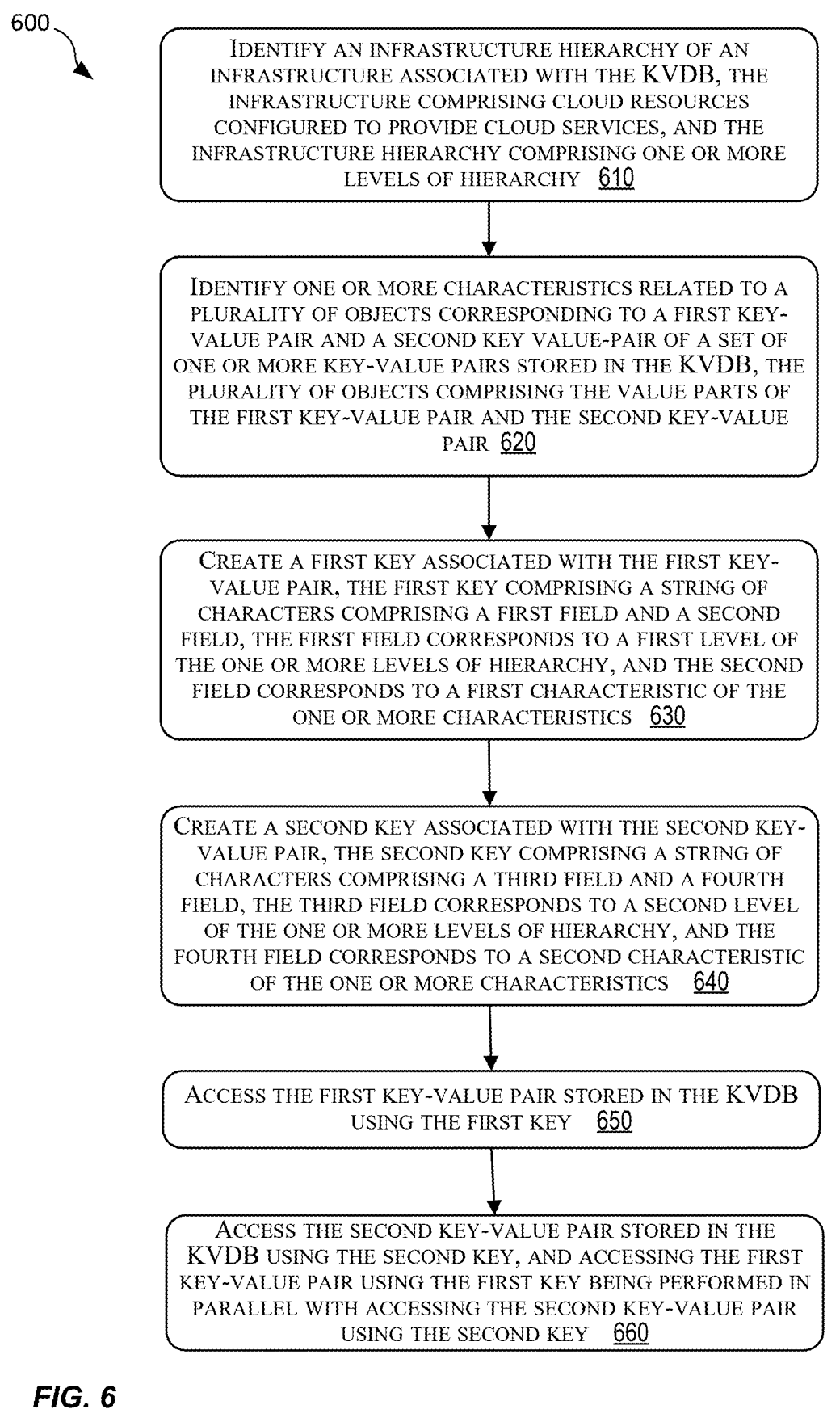

IDENTIFY AN INFRASTRUCTURE HIERARCHY OF AN INFRASTRUCTURE ASSOCIATED WITH THE KVDB, THE INFRASTRUCTURE COMPRISING CLOUD RESOURCES CONFIGURED TO PROVIDE CLOUD SERVICES, AND THE INFRASTRUCTURE HIERARCHY COMPRISING ONE OR MORE LEVELS OF HIERARCHY  610

↓

IDENTIFY ONE OR MORE CHARACTERISTICS RELATED TO A PLURALITY OF OBJECTS CORRESPONDING TO A FIRST KEY-VALUE PAIR AND A SECOND KEY VALUE-PAIR OF A SET OF ONE OR MORE KEY-VALUE PAIRS STORED IN THE KVDB, THE PLURALITY OF OBJECTS COMPRISING THE VALUE PARTS OF THE FIRST KEY-VALUE PAIR AND THE SECOND KEY-VALUE PAIR  620

↓

CREATE A FIRST KEY ASSOCIATED WITH THE FIRST KEY-VALUE PAIR, THE FIRST KEY COMPRISING A STRING OF CHARACTERS COMPRISING A FIRST FIELD AND A SECOND FIELD, THE FIRST FIELD CORRESPONDS TO A FIRST LEVEL OF THE ONE OR MORE LEVELS OF HIERARCHY, AND THE SECOND FIELD CORRESPONDS TO A FIRST CHARACTERISTIC OF THE ONE OR MORE CHARACTERISTICS  630

↓

CREATE A SECOND KEY ASSOCIATED WITH THE SECOND KEY-VALUE PAIR, THE SECOND KEY COMPRISING A STRING OF CHARACTERS COMPRISING A THIRD FIELD AND A FOURTH FIELD, THE THIRD FIELD CORRESPONDS TO A SECOND LEVEL OF THE ONE OR MORE LEVELS OF HIERARCHY, AND THE FOURTH FIELD CORRESPONDS TO A SECOND CHARACTERISTIC OF THE ONE OR MORE CHARACTERISTICS  640

↓

ACCESS THE FIRST KEY-VALUE PAIR STORED IN THE KVDB USING THE FIRST KEY  650

↓

ACCESS THE SECOND KEY-VALUE PAIR STORED IN THE KVDB USING THE SECOND KEY, AND ACCESSING THE FIRST KEY-VALUE PAIR USING THE FIRST KEY BEING PERFORMED IN PARALLEL WITH ACCESSING THE SECOND KEY-VALUE PAIR USING THE SECOND KEY  660

*FIG. 6*

FAST ITERATORS FOR KEY-VALUE DATABASES

FIELD

The present disclosure generally relates to database technologies. More specifically, but not by way of limitation, techniques are described for enabling an iterator (called persistent key-value (KV) iterator) that uses a special key structure embedded with secondary index information for efficient search (or query) of a key-value database (KVDB).

BACKGROUND

Key-value type distributed database has high scalability and robustness, and has been widely applied in many systems.

BRIEF SUMMARY

Various techniques are provided for enabling an iterator (called persistent key-value (KV) iterator) that uses a special key structure embedded with secondary index information for efficient search (or query) of a key-value database (KVDB). In one general aspect, a method may include identifying an infrastructure hierarchy of an infrastructure associated with the KVDB, the infrastructure comprising cloud resources configured to provide cloud services, and the infrastructure hierarchy comprising one or more levels. The method may also include identifying one or more characteristics related to a plurality of objects corresponding to a first key-value pair and a second key-value pair of a set of one or more key-value pairs stored in the KVDB, the plurality of objects comprising value parts of the first key-value pair and the second key-value pair. The method may also include creating a first key associated with the first key-value pair, the first key comprising a first string of characters comprising a first field and a second field, the first field corresponding to a first level of the one or more levels of the infrastructure hierarchy, and the second field corresponding to a first characteristic of the one or more characteristics. The method may also include creating a second key associated with the second key-value pair, the second key comprising a second string of characters comprising a third field and a fourth field, the third field corresponding to a second level of the one or more levels of the infrastructure hierarchy, and the fourth field corresponding to a second characteristic of the one or more characteristics. The method may also include accessing the first key-value pair stored in the KVDB using the first key. The method may also access the second key-value pair stored in the KVDB using the second key, the first key-value pair being accessed using the first key in parallel with the second key-value pair being accessed using the second key.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a non-transitory computer-readable medium, storing computer-executable instructions which, when executed by one or more processors, cause the one or more processors of a computer system to perform one or more methods disclosed herein.

In various embodiments, a computer-program product, comprising computer program/instructions which, when executed by a processor, cause the processor to perform any of the methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 1 is a simplified diagram illustrating a system architecture utilizing persistent key-value (KV) iterator, according to certain embodiments.

FIG. 5 is a flowchart illustrating a lifecycle of keys of a KVDB on which the persistent KV iterator is built, according to certain embodiments.

FIG. 6 is a flowchart illustrating a method of creating keys and using the keys to access KVDB, according to certain embodiments.

DETAILED DESCRIPTION

Figure 2:
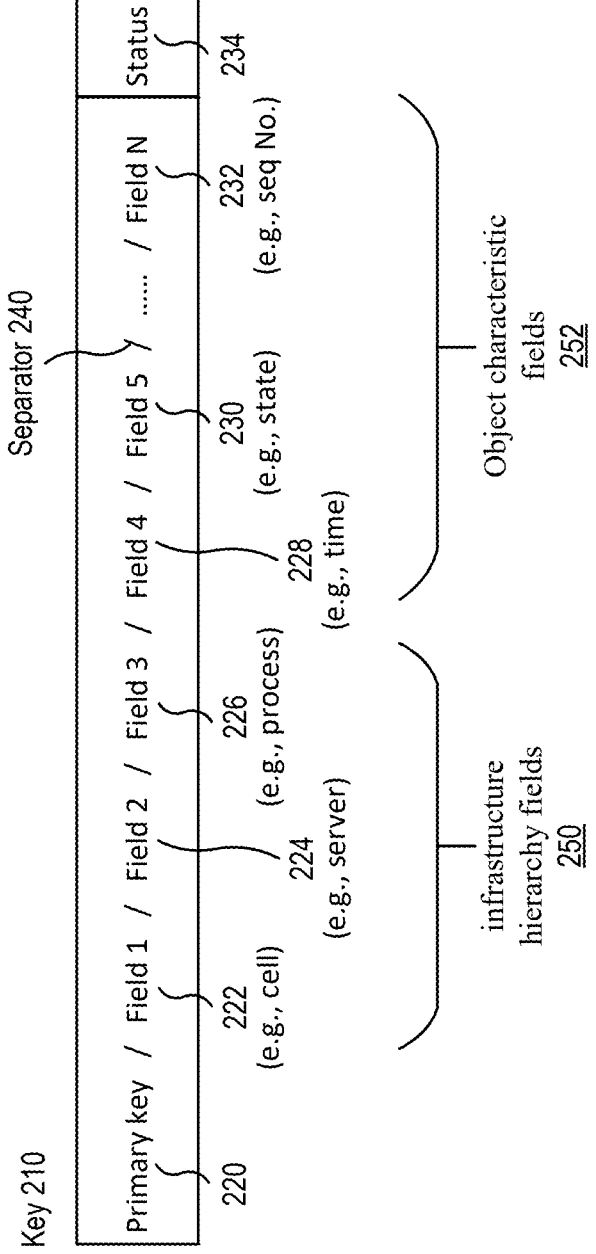
FIG. 2 illustrates an example key structure for efficient search (or query) of a key-value database using the persistent KV iterator, according to certain embodiments.

A Key Value database (KVDB) provides a primitive data access paradigm for storing and retrieving values. Unlike relational databases and even the noSQL columnar databases, a KVDB database does not provide efficient ways to index the data and lookup the data using data values. Instead, it requires the user to know the KEY, and then returns the VALUE. In this sense, it is more like main-memory systems that require the user to provide an address, and then return a value. However, unlike main-memory systems, KVDB efficiently persists the values written, and it is tremendously scalable.

KVDB may use secondary indexes or tertiary indexes that are structured as tables or trees for referencing the primary keys. As a result, two or more big data structures, the primary key data structure, and the secondary index data structure, need to be maintained and cross-referenced. As the number of secondary indexes increases, the update time to those indexes increases linearly. Additionally, these data structures require a two-phase commit because index maintenance may need to acquire locks on data structures for atomic updates to ensure data consistency and integrity.

Thus, such a locking mechanism may introduce contention and serialization among concurrent write and delete operations, leading to increased latency and reduced throughput. Further, different data structures may be partitioned in different ways, leading to complicated cross-sharding issues. Thus, there is a need to address these challenges and others.

The techniques disclosed in the present disclosure enable an iterator (called persistent key-value (KV) iterator) that uses a special key structure by merging the secondary index information with the primary key, such that a key may contain both the primary key and secondary index information together represented by a string of characters. Thus, the techniques do not need to maintain multiple data structures for creating, updating, deleting, and searching key-value pairs in a KVDB. The persistent key-value (KV) iterator may allow to persist data (e.g., storing data in persistent storage, such as a disk) and provide efficient ways to traverse through the data stored in the database.

In some embodiments, the key structure comprises a plurality of fields (also referred to as key indexes) categorized into two groups, infrastructure hierarchy fields and object characteristic fields. The infrastructure hierarchy fields, such as cells, servers, processes, may align with the hierarchy of a cloud infrastructure service. The object characteristic fields, such as time, state information, object sequence number, may be used to track or identify objects involved in the services.

For the purpose of this disclosure, a cell may refer to a group of servers that work together to provide specific cloud services (e.g., compute, storage, database, network, etc.). One or more processes (e.g., garbage collection (GC), object lifecycle management (OLM) for storage service, etc.) may be performed for a cloud service within a cell by requesting (or communicating with) one or more servers to perform operations (e.g., create, retrieve, update, and delete key-value pairs) on a KVDB in parallel. Garbage collection may refer to the process of reclaiming memory or resources that are no longer in use by an application or system. OLM can automatically manage the archiving and deletion of objects stored in Object Storage and Archive Storage based on the rules defined. The processes may also be referred to as consumers of the KVDB.

Such key structure may allow the keys of the KVDB to be partitioned into one or more levels of partitions (referred to as hierarchical partitions). Within each level of partition, sub-key lists may be formed based on different fields. For example, an overall key list (also referred to as a main key list) containing all keys for the KVDB can be partitioned into N key lists for N servers as the first level of the hierarchical partition. Each key list for a server may be further partitioned based on another field (e.g., process, time, state) into multiple sub-key lists as the second-level hierarchy of the hierarchical partition. Such hierarchical partition based on various fields can convert a long overall key list into many smaller key lists for easy search/query of the KVDB.

In some embodiments, the key indexes can be maintained (e.g., create, update, and delete) without using atomic operations (e.g., locking a portion of a data structure when performing an update and unlocking after the update to ensure consistency issue). An update to a key (e.g., modifying the content of a key) of a key-value pair may involve marking a status field of the key to be updated as invalid and creating a new key with the updated information.

In some embodiments, the search/query operations may be performed on the KVDB by multiple consumers (e.g., processes) in parallel. For example, garbage collector (GC)

1 may request server 1 to perform a first query on the KVDB. GC2 process may server 2 to perform a second query on the same KVDB. OLM may perform request server 3 to perform a third query on the KVDB. All three queries can be performed in parallel on the same KVDB. Furthermore, multiple searches/queries may be performed in a server using multiple partitioned key lists in parallel.

For the purpose of this disclosure, the terms, data, objects, and values of the key-value pairs stored in a KVDB may be used interchangeably. Additionally, the terms, search, query, and data access, may be used interchangeably. For example, a partitioned key list may be used to perform searches or queries on, or data access from the KVDB. Finally, the terms concurrently, simultaneously, and in parallel may be used interchangeably.

Embodiments of the present disclosure provide a number of advantages/benefits. For example, the key structure of merged primary key and secondary index information as a string of characters enables easy maintenance of the keys for accessing a KVDB without the need for a two-phase commit because only a single data structure is maintained.

In addition, the key structure enables hierarchical partitioning based on infrastructure and object characteristics, which reduces a long list of keys to multiple small partitions that allow more focused and efficient searches/queries on the KVDB, such as state-based (e.g., data objects that have expired) or time-based traversal (e.g., garbage objects a few days old). Furthermore, modifications/updates (e.g., reads & writes) can have constant overhead, and no complicated locking mechanisms are required.

Finally, concurrent searches/queries or data accesses are possible using multiple partitioned key lists by many consumers (or different processes). Thus, high performance of data access from the KVDB can be achieved.

FIGS. 1-5 describe examples and embodiments related to the persistent key-value (KV) iterator described in this disclosure. FIGS. 6-9 depict examples of architectures for implementing cloud infrastructures for providing one or more cloud services, where the infrastructures may incorporate teachings described herein. FIG. 10 depicts a block diagram illustrating an example computer system or device, according to at least one embodiment.

I. Persistent Key-Value (KV) Iterator

A. System Architecture

FIG. 1 is a simplified diagram illustrating a system architecture utilizing persistent key-value (KV) iterator, according to certain embodiments. Distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As shown in FIG. 1, one or more cells 110 and 140 may exist in a distributed environment 100. A cell may include one or more servers (e.g., server 1 112-server N 116). Each cell may have key-value database (KVDB) (120 or 150)

shared by the servers in the cell, for example, cell 1 110 has a KVDB 120, and cell 2 140 has a KVDB 150. A KVDB (e.g., 120) may have a list of keys (i.e., the key portions of the key-value pairs in the KVDB 150, also referred to as an overall key list or main key list) that can be partitioned into multiple sub-key lists. For example, in KVDB 120, a list of keys accessing all data in the KVDB 120 can be partitioned into many sub-key lists, key list 132, key list 134, and so on. The partitions can be performed in various ways based on the structure of the keys. Further details describing the structure of the keys are described below.

In FIG. 1, one or more processes/operations (e.g., service operations 140 and 142) may be performed in a cell (e.g., cell 1 110). Each of these processes may communicate with the servers (e.g., 112-116) in the cell to access the KVDB 120. In some embodiments, multiple processes may communicate with multiple servers to access the KVDB simultaneously. For example, process 1/service operation 1 140 may communicate with server 1 112 to access KVDB 120. process 1/service operation 2 142 may communicate with server 2 114 to access KVDB 120. The server 1 112 may use key list 132 to access data (i.e., values associated with the keys in key list 132 or the value portions of the key-value pairs 132) in KVDB 120. The server 2 114 may use key list 134 to access data (or values associated with the keys in key list 134) in KVDB 120. Both data accesses via server 1 112 and server 2 114 can be performed in parallel (or simultaneously or concurrently).

B. Structure and Partitioning of Keys

1. Structure of Keys

FIG. 2 illustrates an example key structure for efficient search (or query) of a key-value database using the persistent KV iterator, according to certain embodiments. In FIG. 2, a key 210 may comprise many fields, primary key 220, field 1 222 to field N 232, and status 234. Each field may be separated by a separator 240, which may be a special character, such as '/', '-', or the like. The primary key may be a regular key (e.g., a unique ID, filename, URL, etc.) when the disclosed new key structure is not used. Fields 1-N (222-232) may belong to secondary index information, which can be categorized into two groups, infrastructure hierarchy 250 and object characteristics 252. The fields in infrastructure hierarchy group 250 may include fields related to infrastructure hierarchy, such as field 1 222 for cell (e.g., 110-112 of FIG. 1), field 2 224 for server (e.g., 112-116 of FIG. 1), and field 3 226 for process/service operation (e.g., 140-142 of FIG. 1). Field 3 226 for process may help identify potential consumers (e.g., GC, OLM) of the key, but other consumers may also use the key without considering field 3 226 for query and access the KVDB.

The fields in the object characteristics group 252 may include fields related to characteristics of objects, such as field 4 228 for time (e.g., content including epoch time when an object is created), field 5 230 for state (e.g., content including state information, such as CREATED, EXPIRED, DELETED, etc.), and field N 232 for sequence number (seq No., e.g., each object may have an identification number that is monotonically increasing). An epoch may refer to a cycle required by a process (e.g., GC, replication) to complete certain tasks. For GC, a cycle may be from an application thread starts, until GC identifies garbage objects and reclaims unused memory. For replication, a cycle may be a time period in which objects in one cell need to be replicated to another cell.

Finally, a status field 234 (e.g., valid, or invalid) may indicate the validity of the key or whether the key is in use or not. For example, when a cell likes to modify a key, it may simply mark the key as invalid (or not for use) and create a new key with the desired information.

Comparing a key structure with and without the embedded secondary index information, suppose the primary key is a server ID for identifying a server (e.g., server 1) in a system including the cells. Consumers who like to access the KVDB 120 can only rely on the primary keys with server IDs as partitions to access key-value pairs for different servers, such as server 1 112, server 2 114, etc. However, with the embedded secondary index information, the consumer can be provided with more flexibility to query and identify specific sets of key-value pairs for a particular infrastructure hierarchy and particular object characteristics.

As an illustration of the content of a key, suppose a key for an object (or called element) is created at time T1 by server 1 112 in cell 1 110 under service operation GC. The key may have the secondary index information: "cell 1/server 1/GC/T1/CREATED/seq_no" with valid status.

In some embodiments, one or more fields in the secondary index information may be altered for various purposes. For example, the process field 226 may be used for various infrastructure-related operations besides garbage collection (GC) and object lifecycle management (OLM). Some other infrastructure-related operations may include, but not limited to, checkpoint, replication, etc. For example, the process field 226 may be modified to become "GC, 100" to indicate a checkpoint created for GC process at object sequence number (seq_no) 100, the last object accessed in the KVDB. Therefore, the GC may know its next process can start at object seq_no 101, rather than starting from seq_no again. Each process/operation may maintain its checkpoints, for example, "GC,300" for checkpoint at seq_no 300 for GC process, and "OLM,500" for checkpoint at seq_no 500 for OLM process.

In other embodiments, checkpoint and replication may have their individual fields. For example, when checkpoint is used, the consumer may usually like to retrieve a batch of data objects start from the next object following the checkpoint. Thus, seq_no may not be used. An example key information for individual checkpoint field may be "server/ GC/epoch/checkpoint/batch_size" for accessing a batch of data created at a particular epoch time by starting at a particular checkpoint. Further details describing the checkpoints are described below.

To further illustrate, a key list may be created with the key information, "cell 1/server 1/replication/epoch/*" to indicate to a replication process that all objects in server 1 112 of cell 1 110 are to be replicated from cell 1 110 to cell 2 140 within the epoch time (e.g., between time T0 and time T1). In some embodiments, key information "cell 1/*/replication/epoch/ *" may be used to represent all keys intended for replication in cell 1 110.

2. Partitioning of Keys

Figure 3A:
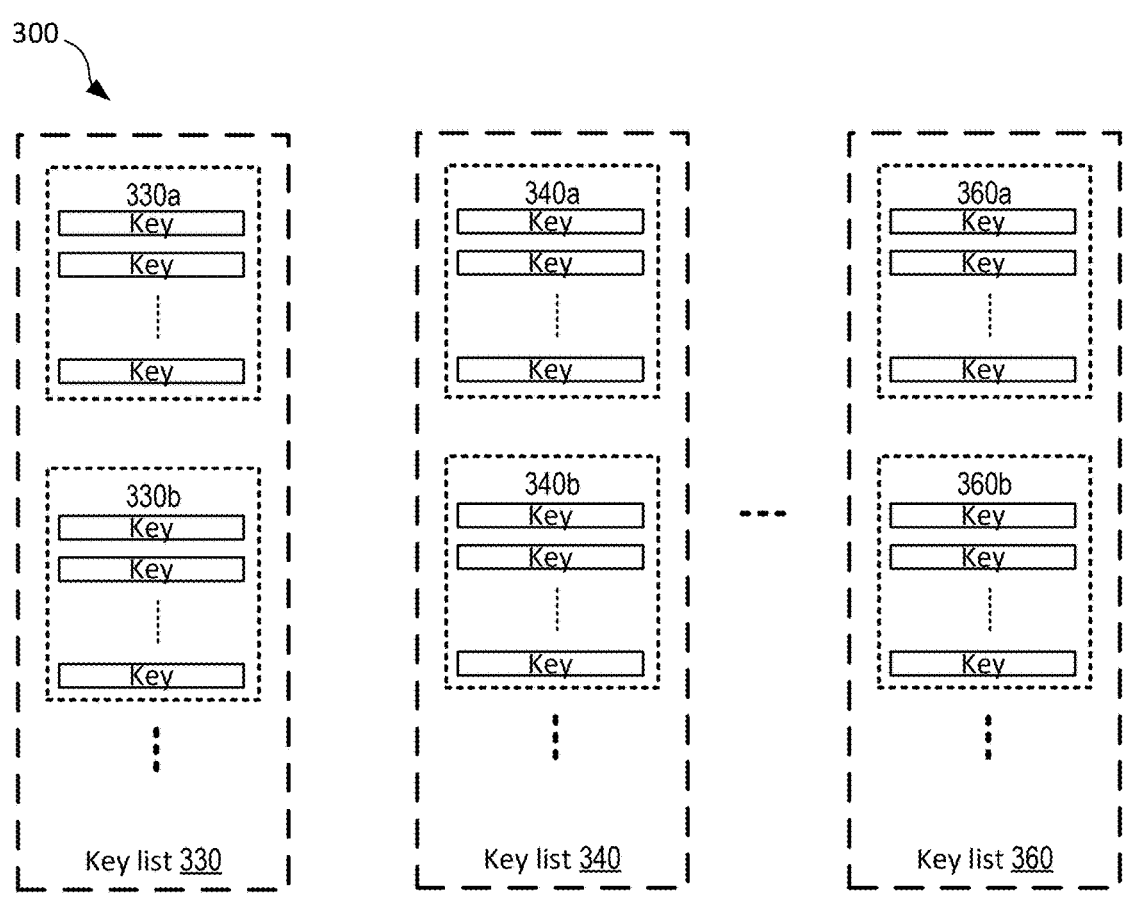
FIGS. 3A and 3B illustrate example hierarchical partitions of keys of a KVDB on which the persistent KV iterator is built, according to certain embodiments.
Figure 3B:
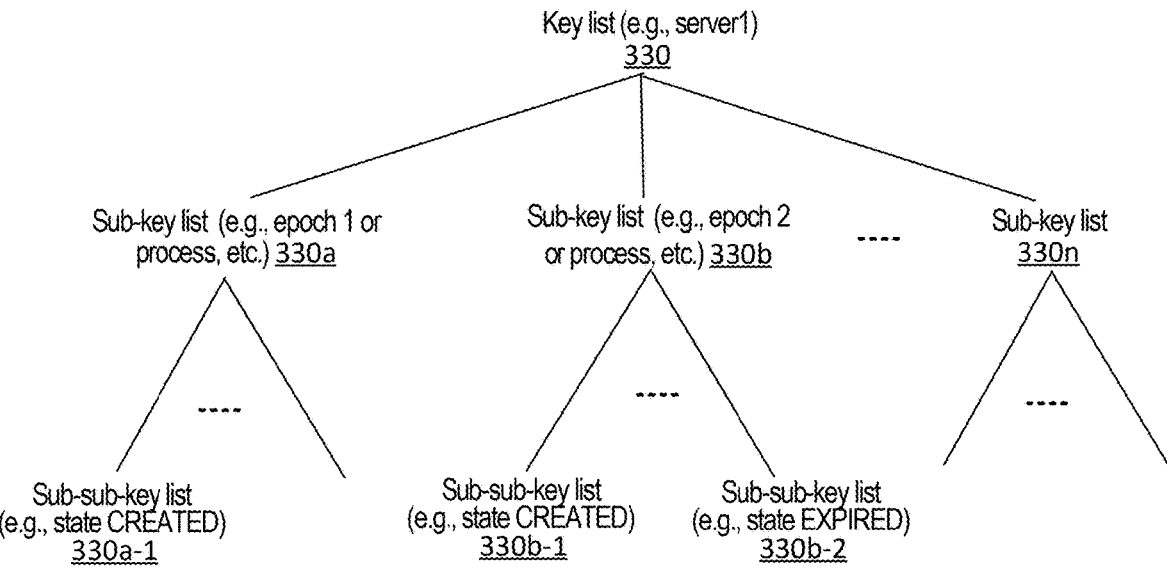

FIGS. 3A and 3B illustrate example hierarchical partitions of keys of a KVDB on which the persistent KV iterator is built, according to certain embodiments. As mentioned earlier, a KVDB of a cell may have a single long list of keys (i.e., the overall key list or main key list). However, because the secondary index information has various fields related to infrastructure hierarchy 250 and object characteristics 252, the overall key list may be partitioned for easy access to data in the KVDB. In some embodiments, the partitions may have multiple levels of hierarchy. For example, all keys in cell 1 110 may have field 1 222 containing "cell 1." Field 2 224 of these keys may be "server 1," "server 2," and "server N," When all keys are sorted based on the server field (or field 2 224) in a particular order, such as lexicographical order, these keys may become N partitions—e.g., the first partition (e.g., key list 330) with keys under server 1, the second partition (e.g., key list 340) with keys under server 2, and the N partition (e.g., key list 360) with keys under server N. In other words, all keys in a particular partition (i.e., key list) may have the same content in server field (or field 2 224). This partition based on the server field may be considered as the first level of partition.

For the second level of partition, each of the N partitions (e.g., server partitions) may be further partitioned into more sub-partitions based on another field, for example, time 228 of FIG. 2. As an example, the key list 330 for server 1 may be further sorted and partitioned based on time information to result in several sub-key lists, 330a for objects, 330a for objects created at epoch time 1, 330b for objects created at epoch time 2, and so on.

For the third level of partition, each of the sub-partitions (e.g., time partitions) may be further partitioned into more sub-sub-partitions based on a third field, for example, state 230 of FIG. 2. As an example, the sub-key list 330b for server 1 may be further sorted and partitioned based on state information to result in several sub-sub-key lists, 330b-₁ for objects in CREATED state, 330b-₂ for objects in EXPIRED state, and so on. Thus, a consumer or user of the KVDB can quickly identify and retrieve data object (or values) within server 1 112 of cell 1 110, that was created at epoch time 2 and has not expired using the sub-sub-key-list 330b-₁.

As another example, the key list 340 for server 2 may be sorted and partitioned based on the process (e.g., 226) as its second-level partition, and the epoch time (e.g., 228) as its third-level partition. Thus, a customer or user of the KVDB can quickly identify and retrieve data (or value) within server 2 114 of cell 1 110, that was created at different epoch times under a particular process. In other words, the hierarchical partitions can be performed using different fields.

As explained above, each first-level key list may be independent from each other, and can be partitioned into many sub-key lists and sub-sub-key lists in different ways. As illustrate above, hierarchical key list for server 1 is partitioned with hierarchy of server, time, and state, as shown in FIG. 3B. Hierarchical key list for server 2 is partitioned with hierarchy of server, process, time.

In some embodiments, at least one infrastructure field may be used and, object characteristic fields may or may not be used because an infrastructure field in a key can help associate it with an infrastructure boundary for query and data retrieval. For example, "cell 1/*/state (EXPIRED)/*" are keys for retrieving all expired objects in cell 1.

3. Update or Modification of Keys

As discussed above, the structure of the keys enables efficient updates without the need of using locking mechanisms, thus simplifying the maintenance of key lists. In some embodiments, the update and modification of a particular key-value pair can be performed by simply marking that key-value pair to be modified as invalid in the status field 234 of its key and creating/adding a new key-value pair with updated (or modified) information at the end of the key list the key belongs to. Once a consumer finishes accessing the KVDB, the keys marked as invalid status are removed or deleted. In some embodiments, marking a key as invalid can be made by setting its associated value part of this key-value pair to a particular value (or status), such as "0xdeadbeef," rather than using the status field. For example, this update process can be done by performing the followings: (1) marking that key-value pair to be modified (i.e., the original key-value pair) as invalid; (2) creating a duplicate of the original key-value pair as the new key-value pair; and (3) modifying the new key-value pair accordingly.

Such an update process avoids the need for reorganization, re-shuffling, or even a two-phase commit (e.g., maintaining consistency between two tables where one has to wait for another to complete the update). For example, a service likes to update a key-value pair with key information, e.g., "cell 1/server 1/GC/time T1/CREATED/object seq_no 2." The service can simply mark the status field 234 of the above key to be invalid (or setting its value to "0xdeadbeef"), then add a new key-value pair to replace the old key with the updated key information (e.g., "cell 1/server 1/GC/time T1/EXPIRED/object seq_no 2") plus a valid status field 234. The associated value of the new key-value pair can be a new value (if both the key and value are updated) or the original value (if only the key is updated).

In some embodiments, an in-memory counter (or a log) is maintained to remember the latest object sequence number (seq_no) that has been created. The in-memory counter can increment by one every time an object is created. As a result, the process of creating a new key with a new object sequence number does not need to read the KVDB to find out the latest seq_no, but just read the in-memory log to find out. In certain embodiments, a checkpoint may be created for every certain number (e.g., 500) of objects created, and those objects belonging to the checkpoint (e.g., object seq_no 0 to seq_no 499) may be written into a disk (or a permanent storage). In certain embodiments, a checkpoint may be created for every certain number (e.g., 300) of objects accessed in the KVDB by a consumer. Thus, the next data access to the KVDB can start with the next object sequence number after the checkpoint. For example, if a checkpoint contains seq_no 300, next data access can start at seq_no 301.

C. Use of Persistent KV Iterator and Concurrent Inquiries

As discussed above, data access from KVDB can be performed concurrently by different processes (e.g., GC and OLM). In some embodiments, multiple data accesses (e.g., for data created at different epoch times) from KVDB can be performed concurrently by a single type of process using multiple partitioned hierarchical key lists.

Figure 4:
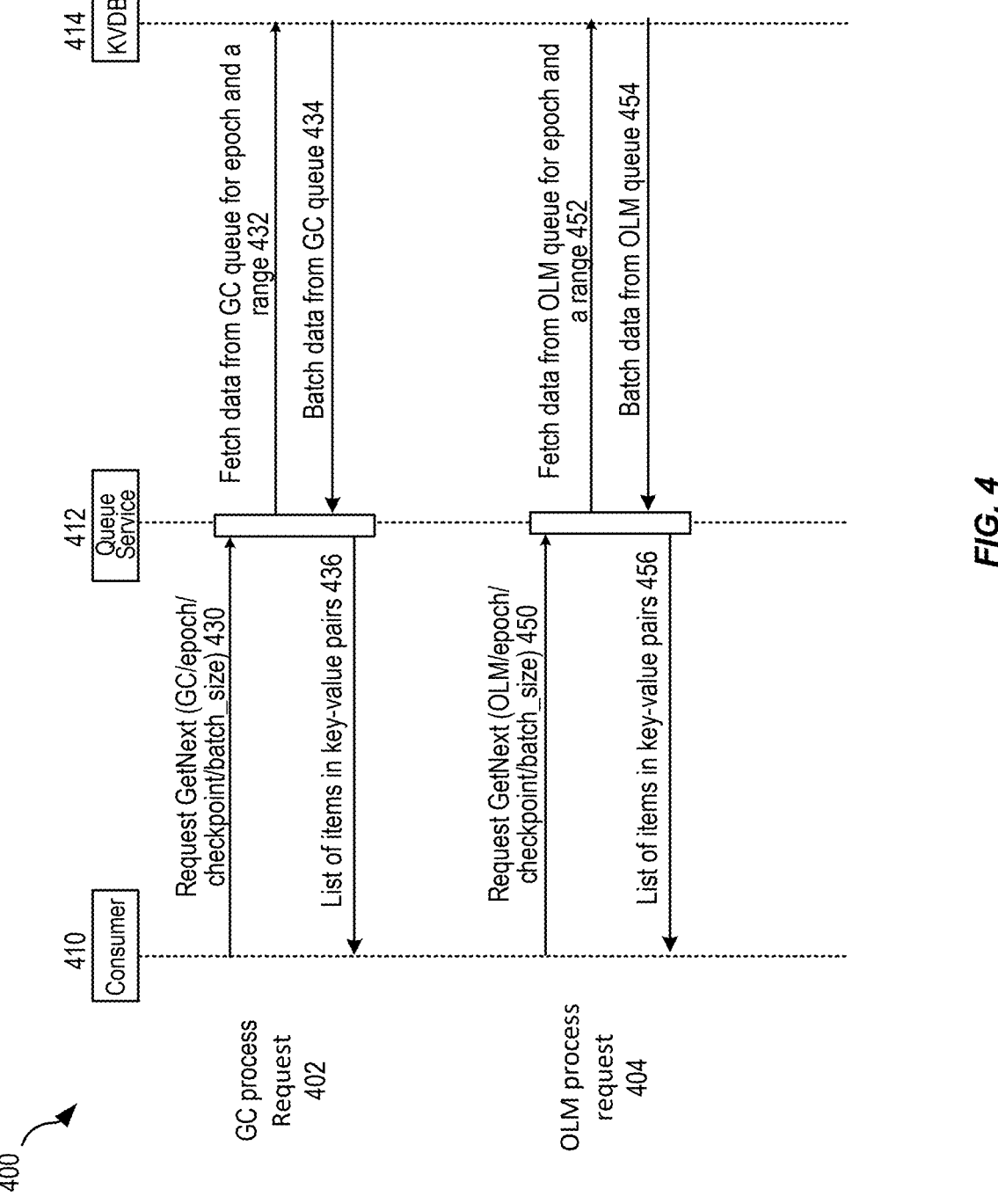
FIG. 4 is a flow diagram illustrating an example use case of the persistent KV iterator, according to certain embodiments.

FIG. 4 is a flow diagram illustrating an example use case of the persistent KV iterator, according to certain embodiments. For example, in FIG. 4, a consumer 410 accessing KVDB 414 may send two requests, GC process request 402 and OLM process request 404 at the same time to a server (e.g., server 1 112) or different servers (e.g., server 1 112 and server 2 114). If the two requests are issued to the same server, both requests can be executed concurrently or simultaneously using two different key lists to access the KVDB.

As an illustration, the GC process request 402 may request a batch of data (e.g., 200 objects) created at a particular epoch time by starting at a particular checkpoint. The GC request may issue a GetNext command 430 that includes secondary index information, "GC/epoch/checkpoint/batch_size" (or "GC,500/epoch/batch_size" indicating checkpoint at seq_no 500) to queue service 412 in server 1 112. The command 430 may be translated and executed to fetch objects (or values or data) associated with the following key list, starting with sequence number (seq_no) 501 after the last checkpoint at seq_no 500 for a batch of 200 objects:

Server ID/GC/epoch/501
Server ID/GC/epoch/502 . . .
Server ID/GC/epoch/700

The above list of keys and values may be referred to as a GC queue, which may be considered a virtual queue. Thus, the command can be executed to fetch data from KVDB in step 432. The batch of data 434 may be retrieved (e.g., the next 200 objects starting from seq_no 501 to seq_no 700) from the GC queue and forwarded (step 436) by the queue service to the consumer 410. The translated key list from command 430 used for the GC process request 402 may be a subset (e.g., 330a of FIG. 3) of the key list 330 for server 1 112.

Similarly, OLM process request 404 may issue a GetNext command 450 that includes secondary index information, "OLM/epoch/checkpoint/batch_size" to queue service 412 in server 1 112. The command 450 may also be translated and executed to fetch objects associated with an OLM queue (i.e., the translated list of keys and values), similar to the discussion above in relation to the GC request. Thus, the command can be executed to fetch data from KVDB in step 452. The batch of data 454 may be retrieved, and forwarded (step 456) by the queue service to the consumer 410. The translated key list from command 450 used for the OLM process request 404 may be a different subset (e.g., 330b of FIG. 3) of the key list 330 for server 1 112.

In some embodiments, two different consumers (one issuing a GC request and another issuing an OLM request) may access the same key-values in a KVDB concurrently. Because the secondary key index has the process field (226 of FIG. 2) that distinguishes the two consumers (e.g., GC and OLM as illustrated in FIG. 4), two sets of key lists pointing to the same set of values can be used. For example, continuing with the above example, the two sets of key lists may be:

"Server 1/GC/epoch/501" to "Server 1/GC/epoch/700"
"Server 1/OLM/epoch/501" to "Server 1/OLM/epoch/700"

Both of the above key lists may point to data objects (or values) with seq_no from 501 to 700 residing on server 1. Thus, two key lists for different processes (or consumers) can be used to access the same set of data objects concurrently. However, the progress of accessing the same set of data objects may be separately tracked for each process (e.g., GC and OLM).

For multiple data access (searches/queries) from KVDB by a single type of process, multiple partitioned key lists may be used for such purpose. For example, a consumer may send three GC process requests to a server (e.g., server 1 112) to access data created at three different epoch times. The first, second, and third GC process requests may include key information "GC/epoch 1/batch_size," "GC/epoch 2/batch_size," "GC/epoch 3/batch_size," respectively. This key information may correspond to three different partitioned key lists. Thus, three requests can be executed to access data from KVDB concurrently.

D. Flowcharts

1. Lifecycle of Persistent KV Iterator

FIG. 5 is a flowchart illustrating a lifecycle of keys (or a method of maintaining key indexes) of a KVDB on which the persistent KV iterator is built, according to certain embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 5 may include a greater number or a lesser number of steps than those depicted in FIG. 5.

At step 510, a key list corresponding to a set of key-value pairs is created for a key-value database. For example, in FIG. 1, each cell (e.g., cell 1 110) has a KVDB (e.g., 120), which includes a set of key-value pairs. The key-value pairs may be created or consumed by cloud services performed by the cell. All keys (i.e., the key portion) of the set of key-value pairs are referred to as an overall key list or main key list (before partitioning), which combines key lists, 132, 134, and 136, shown in FIG. 1.

At step 520, the key list (i.e., a set of keys) may be partitioned into multiple hierarchical partitions. For example, in FIGS. 2 and 3, the overall key list may be partitioned based on infrastructure hierarchy fields 250, object characteristic fields 252, or both. As an example, the overall key list for cell 1 110 may be partitioned based on N servers into N key lists (e.g., key list 330, 340, ..., 360) as the first level hierarchy of the hierarchical partition. Next, the key list 330 for server 1 may be further partitioned based on epoch time field (e.g., 228) into multiple sub-key lists (e.g., 330a, 330b, ...) as the second level hierarchy of the hierarchical partition. Then, each of the sub-key lists (e.g., 330a, 330b, ...) can also be further partitioned based on another field, for example, state field (e.g., 230), into multiple sub-sub-key lists as third level hierarchy of the hierarchical partition. Such partitioning can continue as needed to convert a long overall key list into many smaller key lists for easy searching/querying the KVDB.

At step 530, a key of the key list may be updated by marking the key to be updated as invalid and creating a new key with the updated information. For example, to change the value of the state field 230 of a key X from A to B, the status field 234 of key X can be marked as "invalid," and a new key Y can be created with the desired state value B while setting its status field 234 to "valid." In some embodiments, instead of using the status field, the key can be marked as invalid by setting its associated value part of this key-value pair to a particular value, such as "0xdeadbeef" As a result, the old key X may not be used by any consumer of the KVDB, and can be automatically deleted after a database inquiry by the consumer who makes the update.

At step 540, data (or data objects or values) from the KVDB may be accessed using one or more of hierarchical partitions of the key list. A hierarchical partition, either the first level, second level, or third level, can be used to access data from the KVDB. In some embodiments, three different key lists from different levels of the hierarchical partition may be used to access the KVDB concurrently (or simultaneously or in parallel). For example, key list 360 partitioned based on servers can be used to access all data objects related to server N 116. A sub-key list 340a partitioned based on "server 2/epoch time 2" can be used to access all data objects in server 2 114 that are created at epoch time 2. A sub-sub-key list 330a-1 partitioned based on "server 1/GC/state EXPIRED" can be used to access all data objects in server 1 112 that are related to GC process and have expired state.

At step 550, the key marked as invalid be deleted. As discussed above, the key structure of the disclosed techniques maintains only one overall key list. Any update to a key-value pair may not require a locking mechanism; just mark the key of the key-value pair as invalid and add a new key with the updated information. All keys marked as invalid in their status field 234 (or their associated values having "0xdeadbeef") may be deleted or cleaned up after an inquiry to the KVDB. These keys, once marked as invalid, may not be used by other consumers or processes before they are deleted.

2. Key Creation

FIG. 6 is a flowchart illustrating a method of creating keys and using the keys to access KVDB, according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 6 may include a greater number or a lesser number of steps than those depicted in FIG. 6.

At step 610, an infrastructure hierarchy of an infrastructure associated with the KVDB may be identified, where the infrastructure comprises cloud resources configured to provide cloud services, and the infrastructure hierarchy comprises one or more levels of hierarchy. For example, in FIGS. 1 and 2, an infrastructure may include multiple cells. One of the cells, cell 1 110 has an infrastructure hierarchy of cell 1, which includes a group of servers (e.g., servers 112-116). Each server may perform/execute processes or service operations (e.g., 140 and 142).

At step 620, one or more characteristics related to a plurality of objects corresponding to a first key-value pair and a second key value-pair of a set of one or more key-value pairs stored in the KVDB may be identified, where the plurality of objects comprises the value parts of the first key-value pair and the second key-value pair. For example, in FIGS. 1 and 2, each data object of the data objects (or values of the key-value pairs) stored in the KVDB may have certain characteristics, such as epoch time (e.g., when the data object was created), the state (e.g., CREATED, EXPIRED, DELETED, etc.) of the data object.

At step 630, a first key associated with the first key-value pair may be created, where the first key comprises a string of characters comprising a first field and a second field; the first field corresponds to a first level of the one or more levels of hierarchy, and the second field corresponds to a first characteristic of the one or more characteristics. For example, in FIG. 2, the key structure of a key 210 of the first key-value pair stored in the KVDB may be a string of characters containing the secondary index information, which may include at least one of the infrastructure hierarchy fields 250, such as field 2 224 for server (e.g., 112-116 of FIG. 1), and at least one of the object characteristic fields 252, such as field 5 230 for state (e.g., CREATED, EXPIRED, DELETED, etc.).

At step 640, a second key associated with the second key-value pair may be created, where the second key comprises a string of characters comprising a third field and a fourth field; the third field corresponds to a second level of the one or more levels of hierarchy, and the fourth field corresponds to a second characteristic of the one or more characteristics. For example, in FIG. 2, the key structure of a key 210 of the second key-value pair stored in the KVDB may be a string of characters containing the secondary index information, which may include at least one of the infrastructure hierarchy fields 250, such as field 3 226 for process/service operation (e.g., 140-142 of FIG. 1), and at least one of the object characteristic fields 252, such as field 4 228 for epoch time.

At step 650, the first key-value pair stored in the KVDB may be accessed using the first key. For example, a consumer may use the first key with secondary index information of "server 1/state (CREATED)" to search/inquire all data objects in server 1 that have CREATED state, and access these data objects once identified. The other fields, such as process, may be "do not care" during this partitioning process.

At step 660, the second key-value pair stored in the KVDB may be accessed using the second key, where accessing the first key-value pair using the first key may be performed in parallel with accessing the second key-value pair using the second key. For example, the same consumer or a different consumer may use the second key with secondary index information of "server 2/replication/epoch time" to perform replication (e.g., server 2 to server N) of all data objects in server 2 within the epoch time. Both searches/inquiries, or data accesses to the KVDB may be performed in parallel using two different keys (e.g., the first key and the second key).

II. Example Cloud Service Provider Infrastructure (CSPI) Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middle-ware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
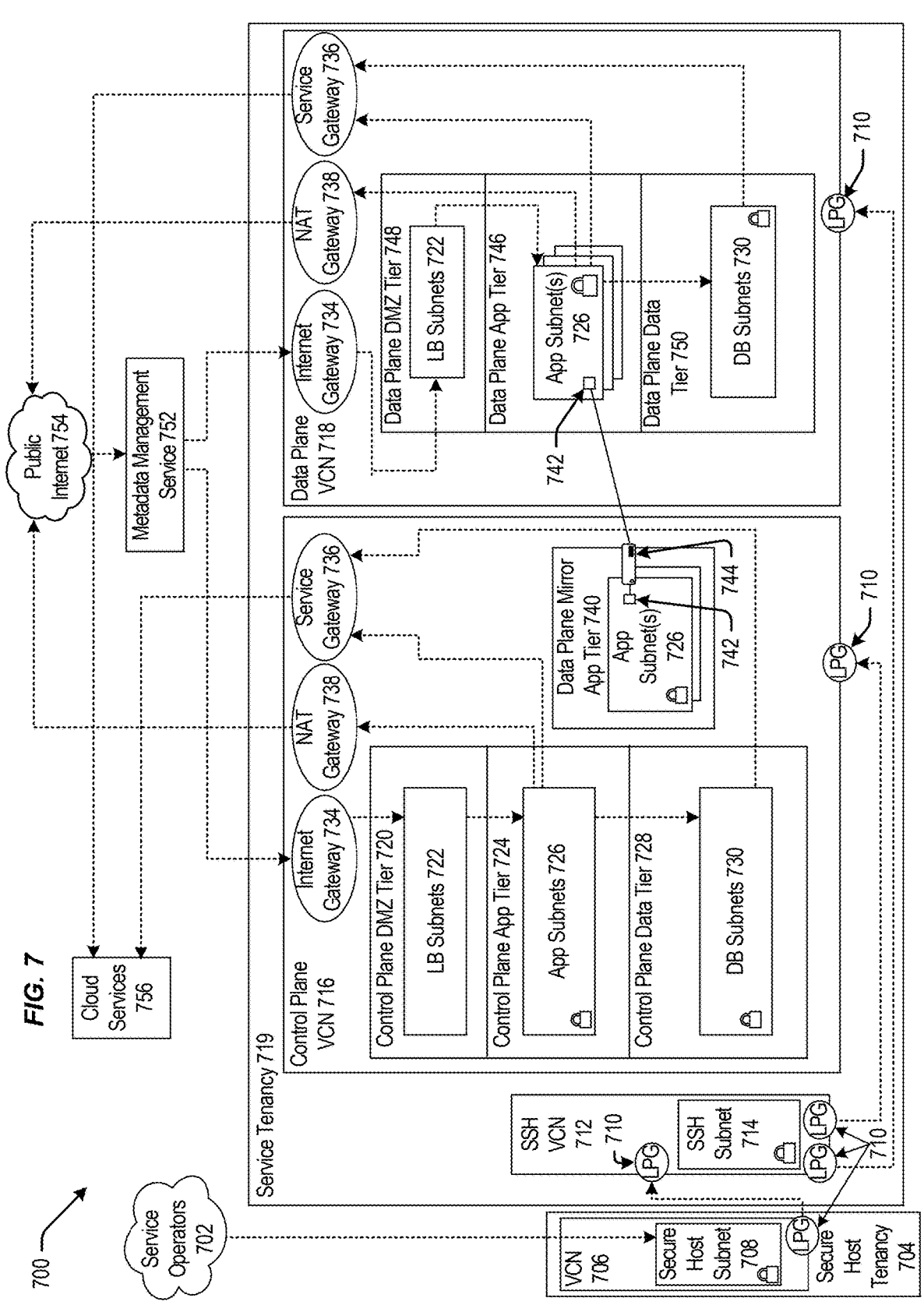
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
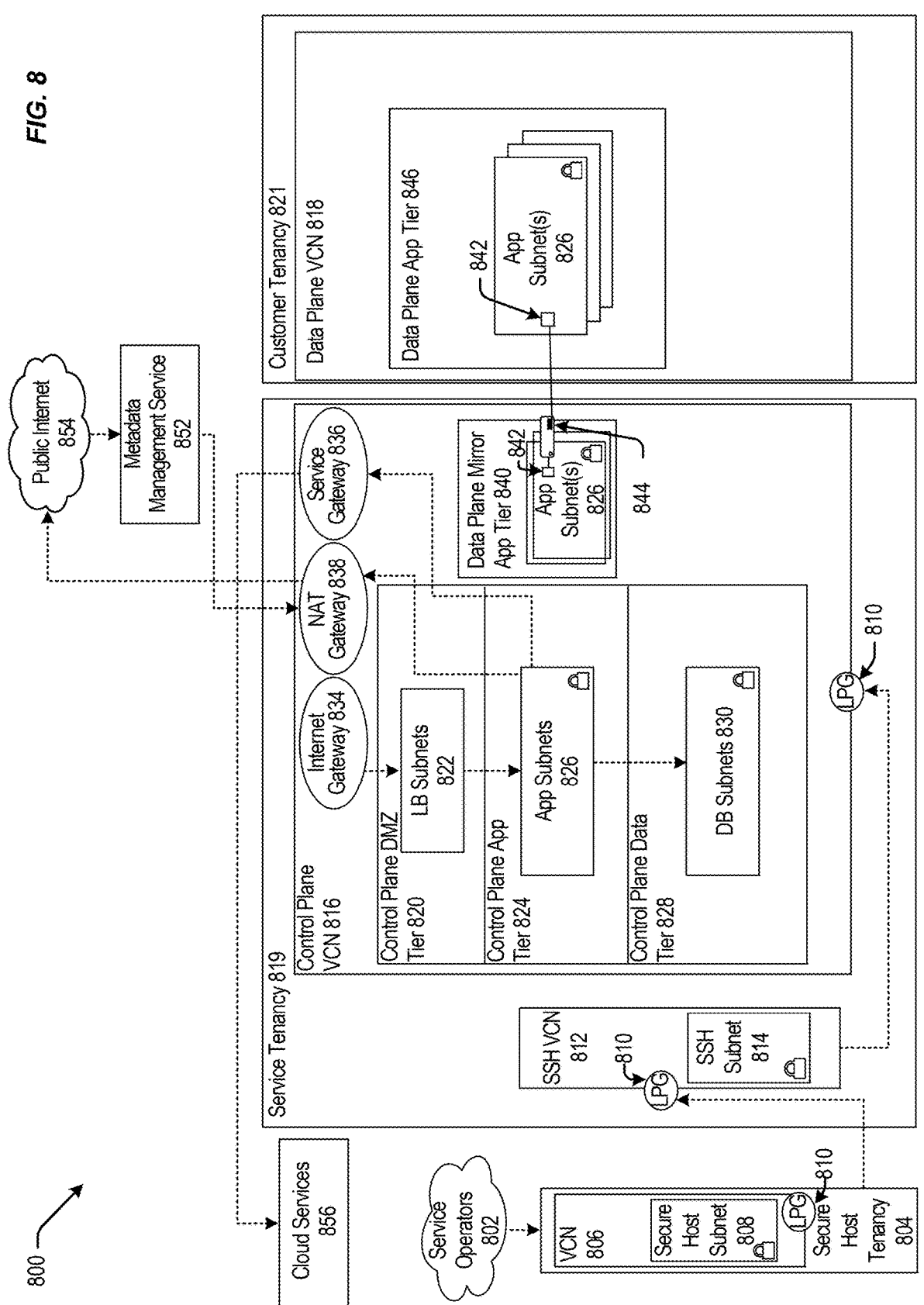
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
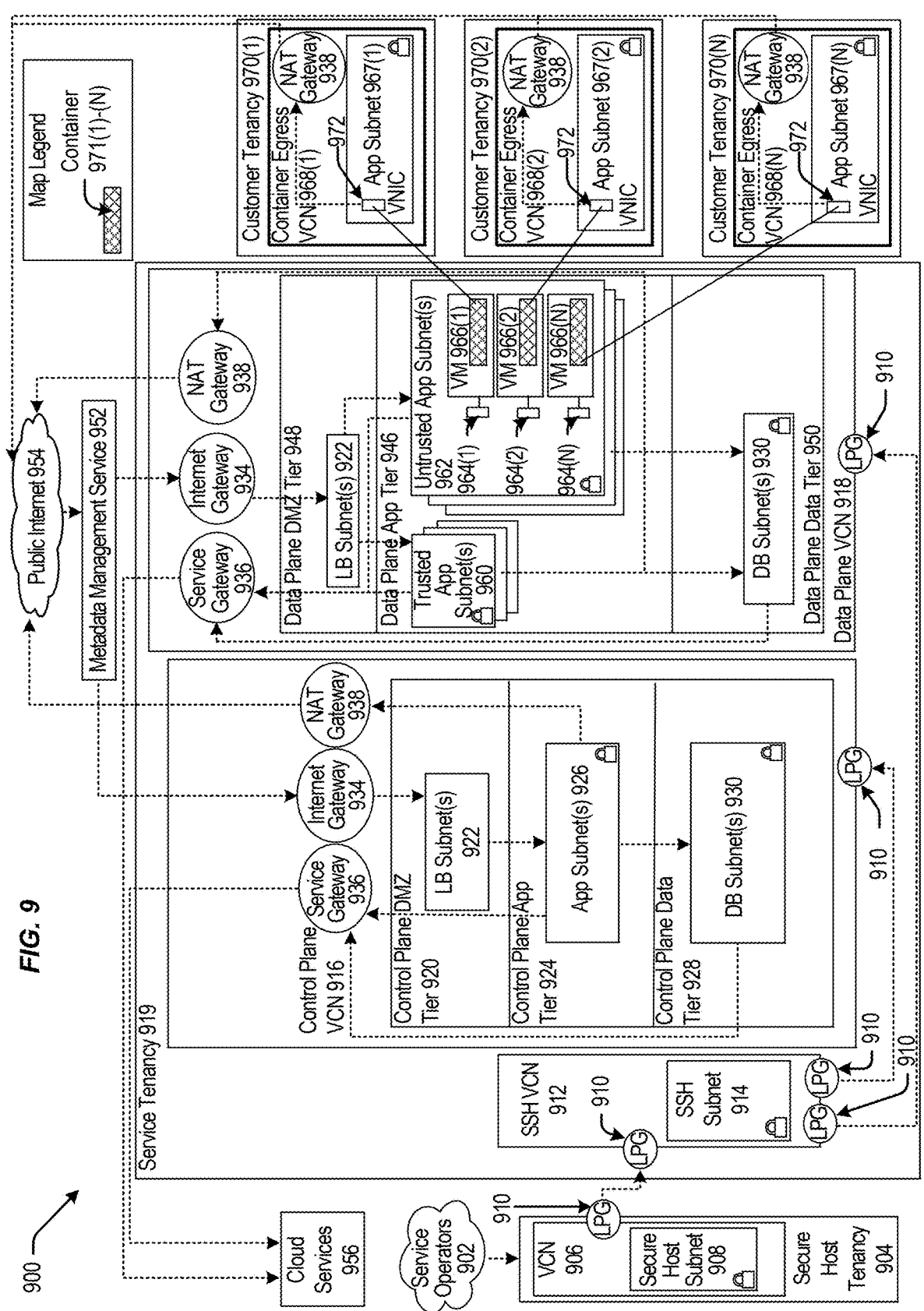
FIG. 9 is a block diagram illustrating another pattern for implementing a cloud infrastructure as a service system, according to at least one embodiment.
Figure 10:
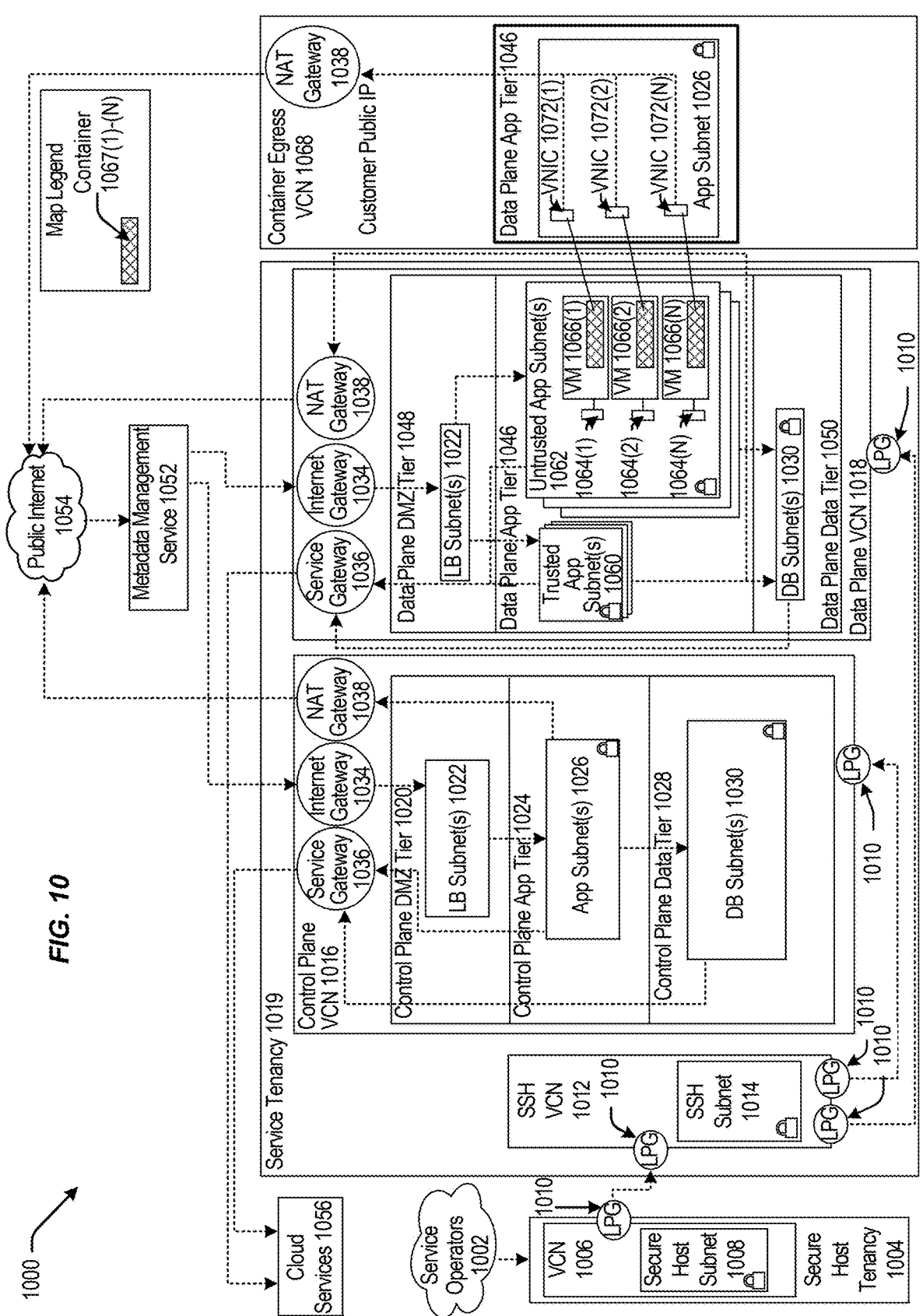
FIG. 10 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT)

gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N)

running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
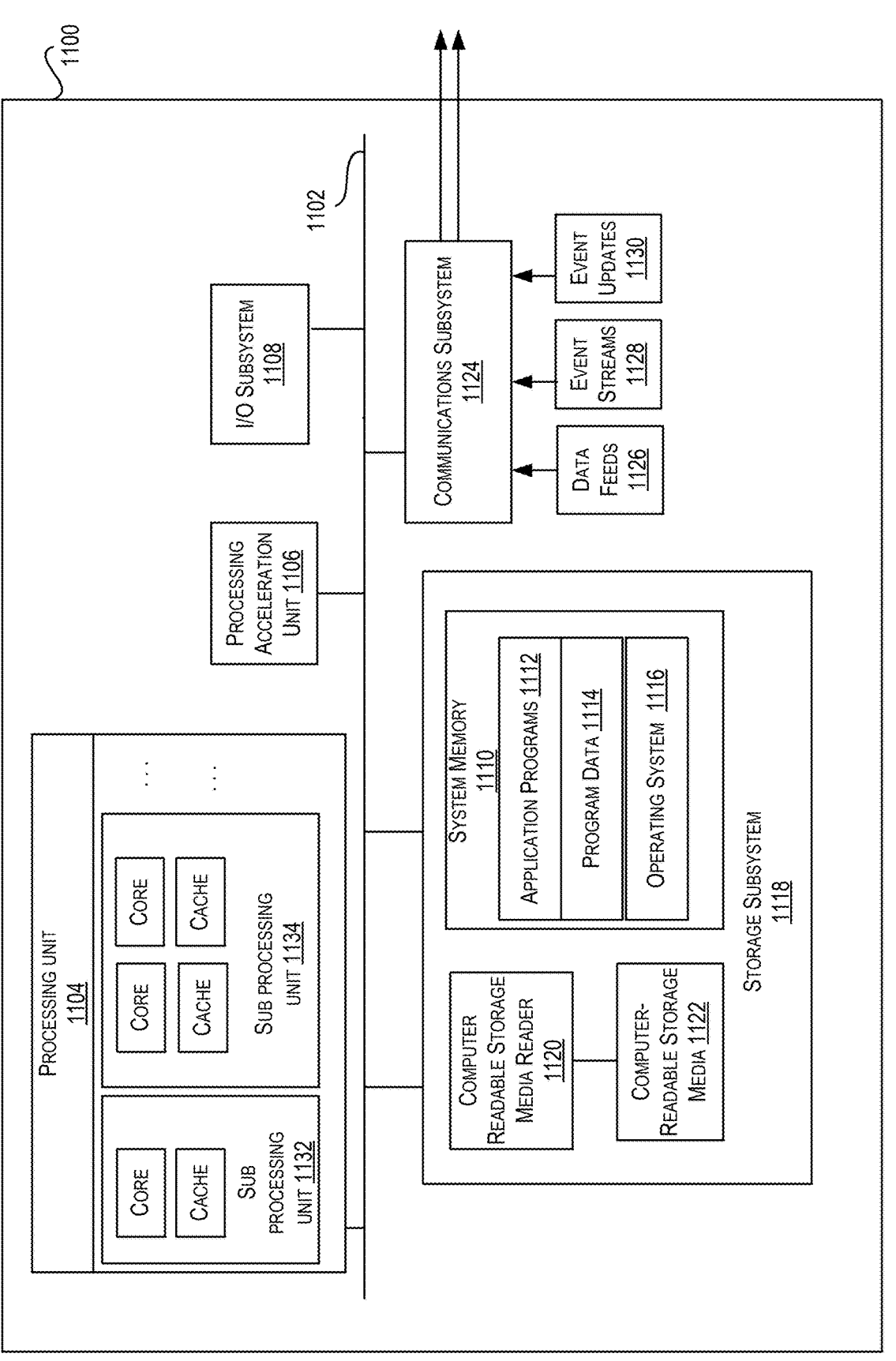
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a specialpurpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computerreadable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/ Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for accessing a key-value database (KVDB), comprising:

identifying an infrastructure hierarchy of an infrastructure associated with the KVDB, the infrastructure comprising cloud resources configured to provide cloud services, and the infrastructure hierarchy comprising one or more levels;

identifying one or more characteristics related to a plurality of objects corresponding to a first key-value pair and a second key-value pair of a set of one or more key-value pairs stored in the KVDB, the plurality of objects comprising value parts of the first key-value pair and the second key-value pair;

creating a first key associated with the first key-value pair, the first key comprising a first string of characters comprising a first field and a second field, the first field corresponding to a first level of the one or more levels of the infrastructure hierarchy, and the second field corresponding to a first characteristic of the one or more characteristics;

creating a second key associated with the second key-value pair, the second key comprising a second string of characters comprising a third field and a fourth field, the third field corresponding to a second level of the one or more levels of the infrastructure hierarchy, and the fourth field corresponding to a second characteristic of the one or more characteristics;

accessing the first key-value pair stored in the KVDB using the first key based at least in part on a first query of the KVDB including the first characteristic or the first level; and accessing the second key-value pair stored in the KVDB using the second key based at least in part on a second query of the KVDB including the second characteristic or the second level, the first key-value pair being accessed using the first key in parallel with the second key-value pair being accessed using the second key.

2. The method of claim 1, further comprising partitioning a main key list into a first key list and a second key list based at least in part on the infrastructure hierarchy, wherein the main key list comprises keys of the set of one or more key-value pairs stored in the KVDB.

3. The method of claim 2, wherein the first key list comprises keys containing the same content in their first field, and wherein the second key list comprises keys containing the same content in their third field.

4. The method of claim 3, further comprising partitioning the first key list into a first sub-key list and a second sub-key list based at least in part on the one or more characteristics.

5. The method of claim 4, wherein the first sub-key list comprises keys containing the same content in the second field, and wherein the second sub-key list comprises keys containing the same content in the fourth field.

6. The method of claim 1, wherein the infrastructure hierarchy comprises cells, servers, and processes.

7. The method of claim 6, wherein each cell comprises one or more servers, and each server performs operations on the KVDB.

8. The method of claim 1, wherein the one or more characteristics related to the plurality of objects comprises time information, state information, and object sequence number.

9. The method of claim 1, further comprising modifying content of the second field of the first key associated with the first key-value pair, wherein modifying the content of the second field of the first key comprises:

marking the first key as invalid;

creating a third key associated with a third key-value pair, the third key-value pair being a duplicate of the first key-value pair;

modifying the second field of the third key; and deleting the first key-value pair.

10. The method of claim 1, wherein the first field comprises a checkpoint, and wherein the checkpoint is an object sequence number corresponding to the last object accessed in the KVDB in an inquiry.

11. A non-transitory computer-readable medium storing computer-executable instructions that, when executed by one or more processors of a computing system, cause the one or more processors to perform operations comprising:

identifying an infrastructure hierarchy of an infrastructure associated with a key-value database (KVDB), the infrastructure comprising cloud resources configured to provide cloud services, and the infrastructure hierarchy comprising one or more levels;

identifying one or more characteristics related to a plurality of objects corresponding to a first key-value pair and a second key-value pair of a set of one or more key-value pairs stored in the KVDB, the plurality of objects comprising value parts of the first key-value pair and the second key-value pair;

creating a first key associated with the first key-value pair, the first key comprising a first string of characters comprising a first field and a second field, the first field corresponding to a first level of the one or more levels of the infrastructure hierarchy, and the second field corresponding to a first characteristic of the one or more characteristics;

creating a second key associated with the second key-value pair, the second key comprising a second string of characters comprising a third field and a fourth field, the third field corresponding to a second level of the one or more levels of the infrastructure hierarchy, and the fourth field corresponding to a second characteristic of the one or more characteristics;

accessing the first key-value pair stored in the KVDB using the first key based at least in part on a first query including the first characteristic or the first level; and accessing the second key-value pair stored in the KVDB using the second key based at least in part on a second query including the second characteristic or second first level, the first key-value pair being accessed using the first key in parallel with the second key-value pair being accessed using the second key.

12. The non-transitory computer-readable medium of claim 11, further comprising partitioning keys of the set of one or more key-value pairs stored in the KVDB into a first key list and a second key list based at least in part on the infrastructure hierarchy, wherein the first key list comprises keys containing the same content in their first field, and wherein the second key list comprises keys containing the same content in their third field.

13. The non-transitory computer-readable medium of claim 12, further comprising partitioning the first key list into a first sub-key list and a second sub-key list based at least in part on the one or more characteristics, wherein the first sub-key list comprises keys containing the same content in the second field, and wherein the second sub-key list comprises keys containing the same content in the fourth field.

14. The non-transitory computer-readable medium of claim 11, further comprising modifying content of the second field of the first key associated with the first key-value pair, wherein modifying the content of the second field of the first key comprises:

marking the first key as invalid;

creating a third key associated with a third key-value pair, the third key-value pair being a duplicate of the first key-value pair;

modifying the second field of the third key; and deleting the first key-value pair.

15. The non-transitory computer-readable medium of claim 11, wherein the first field comprises a checkpoint, and wherein the checkpoint is an object sequence number corresponding to the last object accessed in the KVDB in an inquiry.

16. A computing system, comprising:

one or more processors; and one or more computer readable media storing computer-executable instructions that, when executed by the one or more processors of the computing system, cause the computing system to:

identify, by the computing system, an infrastructure hierarchy of an infrastructure associated with key-value database (KVDB), the infrastructure comprising cloud resources configured to provide cloud services, and the infrastructure hierarchy comprising one or more levels;

identify, by the computing system, one or more characteristics related to a plurality of objects corresponding to a first key-value pair and a second key-value pair of a set of one or more key-value pairs stored in the KVDB, the plurality of objects comprising value parts of the first key-value pair and the second key-value pair;

create, by the computing system, a first key associated with the first key-value pair, the first key comprising a first string of characters comprising a first field and a second field, the first field corresponding to a first level of the one or more levels of the infrastructure hierarchy, and the second field corresponding to a first characteristic of the one or more characteristics;

create, by the computing system, a second key associated with the second key-value pair, the second key comprising a second string of characters comprising a third field and a fourth field, the third field corresponding to a second level of the one or more levels of the infrastructure hierarchy, and the fourth field corresponding to a second characteristic of the one or more characteristics;

access, by the computing system, the first key-value pair stored in the KVDB using the first key based at least in part on a first query including the first characteristic or the first level; and access, by the computing system, the second key-value pair stored in the KVDB using the second key based at least in part on a second query including the second characteristic or the second level, the first key-value pair being accessed using the first key in parallel with the second key-value pair being accessed using the second key.

17. The computing system of claim 16, wherein the computing system is further caused to partition keys of the set of one or more key-value pairs stored in the KVDB into a first key list and a second key list based at least in part on the infrastructure hierarchy, wherein the first key list comprises keys containing the same content in their first field, and wherein the second key list comprises keys containing the same content in their third field.

18. The computing system of claim 17, wherein the computing system is further caused to partition the first key list into a first sub-key list and a second sub-key list based at least in part on the one or more characteristics, wherein the first sub-key list comprises keys containing the same content in the second field, and wherein the second sub-key list comprises keys containing the same content in the fourth field.

19. The computing system of claim 16, wherein the computing system is further caused to modify content of the second field of the first key associated with the first key-value pair, wherein modifying the content of the second field of the first key comprises:

marking the first key as invalid;

creating a third key associated with a third key-value pair, the third key-value pair being a duplicate of the first key-value pair;

modifying the second field of the third key; and deleting the first key-value pair.

20. The computing system of claim 16, wherein the first field comprises a checkpoint, and wherein the checkpoint is an object sequence number corresponding to the last object accessed in the KVDB in an inquiry.

*   *   *   *   *